United States Patent
Nelson

(10) Patent No.: US 10,959,100 B1
(45) Date of Patent: Mar. 23, 2021

(54) SECURED COMMUNICATIONS ROUTING IN A NETWORK

(71) Applicant: Charter Communications Operating, LLC, St. Louis, MO (US)

(72) Inventor: Kevin A. Nelson, St. Charles, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/656,314

(22) Filed: Oct. 17, 2019

(51) Int. Cl.
*H04M 3/16* (2006.01)
*H04W 12/10* (2021.01)
*H04W 88/16* (2009.01)
*H04W 12/00* (2021.01)
*H04L 29/06* (2006.01)
*H04W 76/12* (2018.01)

(52) U.S. Cl.
CPC ..... *H04W 12/1002* (2019.01); *H04L 63/0272* (2013.01); *H04W 12/001* (2019.01); *H04W 76/12* (2018.02); *H04W 88/16* (2013.01)

(58) Field of Classification Search
CPC ............ H04W 12/1002; H04W 76/12; H04W 12/001; H04W 88/16; H04W 8/245; H04L 63/0272; H04M 1/72519; H04M 1/72522
USPC ........................ 455/411, 445, 550.1; 713/153
See application file for complete search history.

(56) References Cited

U.S. PATENT DOCUMENTS

| | | | | |
|---|---|---|---|---|
| 8,752,138 B1* | 6/2014 | Bennett | ................ | H04L 65/403 348/211.12 |
| 10,284,541 B1* | 5/2019 | Subramanian | .. | H04W 12/00503 |
| 2009/0154463 A1* | 6/2009 | Hines | .................. | H04L 67/1053 370/392 |
| 2012/0216033 A1* | 8/2012 | Ogata | .................. | G06F 21/608 713/151 |
| 2012/0272055 A1* | 10/2012 | Jung | ................... | H04L 63/0869 713/153 |
| 2013/0036465 A1* | 2/2013 | Chuan | ..................... | G06F 21/85 726/22 |
| 2013/0258842 A1* | 10/2013 | Mizutani | ................ | H04L 45/48 370/228 |
| 2013/0347062 A1* | 12/2013 | Matityahu | ............... | H04L 63/20 726/1 |
| 2014/0196126 A1* | 7/2014 | Peterson | .......... | H04W 12/0027 726/5 |
| 2014/0380001 A1* | 12/2014 | Schubert | ............... | G06F 21/554 711/153 |
| 2017/0126626 A1* | 5/2017 | Datta | .................. | H04L 63/0869 |
| 2017/0359309 A1* | 12/2017 | Bolte | ................... | H04W 24/08 |
| 2019/0212425 A1* | 7/2019 | Odejerte, Jr. | .......... | G08C 17/02 |

(Continued)

*Primary Examiner* — Danh C Le

(74) *Attorney, Agent, or Firm* — Armis IP Law, LLC

(57) ABSTRACT

Gateway hardware/software (such as associated with a router in a subscriber domain) provides multiple communication devices access to a remote network. During operation, the gateway hardware establishes a secured tunnel between the gateway hardware and a remote communication device over a shared communication link. The gateway hardware also establishes a non-secure channel over the shared communication link. The gateway hardware analyzes communications received from multiple communication devices; the communications are destined for delivery to recipients in the remote network. Depending on attributes of the received communications, the gateway hardware selectively forwards each of the received communications over the secured tunnel or the non-secure channel.

31 Claims, 11 Drawing Sheets

(56) References Cited

U.S. PATENT DOCUMENTS

2019/0334864 A1* 10/2019 Yin ................... H04L 63/0272
2020/0252234 A1* 8/2020 Ramamoorthi ..... H04L 12/4641

* cited by examiner

MAP 275

| USER | COMMN. DEVICE | NETWORK ADDRESS | COMMN. MGT PROFILE |
|---|---|---|---|
| JANE DOE (108-1) | 110-1 | XXXA | 321 |
| JOHN DOE (108-2) | 110-2 | XXXB | 322 |
| JAMES DOE (108-3) | 110-3 | XXXC | 323 |
| JILL DOE (108-4) | 110-4 | XXXD | 324 |

FIG. 3

SECURED COMMUNICATIONS ROUTING IN A NETWORK

BACKGROUND

Conventional wireless routers (such as those supporting WiFi™ or other types of communications) provide wireless communication devices access to a remote network such as the Internet.

As an example, a communication device initially establishes a wireless communication link with a wireless access point. Via the wireless communication link, the mobile communication device communicates requests for content to the wireless access point. The wireless access point forwards the requests to an appropriate server resource in a network to retrieve the requested content. Upon receiving the requested content form a server resource, the wireless access point then wirelessly communicates the content to the requesting communication device.

Unfortunately, communications via a conventional router are not always secure. For example, the network traffic through a router can be easily monitored to identify information such content type being retrieved, source requesting the content, etc.

One type of secure network is based on TOR (a.k.a., The Onion Router). So-called onion routing supports anonymous communications over a network. Via an onion network, messages are encapsulated in layers of encryption. Encrypted data passes through multiple network nodes called onion routers. Each router removes a single layer of the communication, uncovering the data's next destination. When the final layer is decrypted, the message arrives at its destination. According to such techniques, a sender remains anonymous because each intermediate node in the network is aware of only the location of the immediately preceding and following nodes associated with the data packet.

A conventional TOR browser conceals users' identities and their online activity from surveillance and traffic analysis by separating identification and routing. In general, TOR routing includes so-called onion routing as previously discussed.

BRIEF DESCRIPTION OF EMBODIMENTS

Embodiments herein provide novel ways of efficiently providing secured and non-secured communications in a network environment.

More specifically, in one embodiment, a gateway (such as implemented via hardware and/or software) provides multiple communication devices access to a remote network. During operation, the gateway establishes a secured tunnel between the gateway and a remote communication device over a shared communication link. The gateway also establishes a non-secure channel over the shared communication link. The gateway analyzes communications received from multiple communication devices;

assume that the communications are destined for delivery to recipients in the remote network. Depending on attributes of the received communications, the gateway selectively forwards each of the received communications over the secured tunnel to the remote communication device or the non-secure channel directly to the remote network such as the Internet.

Further embodiments herein include establishing the secured tunnel as a persistent virtual private network connection between the gateway and the remote communication device.

In one nonlimiting example embodiment, the gateway encrypts any data packets destined for delivery over the secured tunnel to the remote communication device. The remote communication device decrypts the encrypted communications received over the secured tunnel. The remote communication device then acts as a proxy from which to distribute the decrypted communications (such as information or web page requests) to corresponding target destination addresses.

In response to transmitting request messages on behalf of a respective communication device, the remote communication device receives reply messages including requested content from the respective target destination address (server resources). The remote communication device encrypts the reply messages and forwards such communications over the secured tunnel to the gateway.

In one embodiment, in accordance with further message processing, the gateway receiving the communications over the tunnel from the remote communication device decrypts the received reply messages over the secured tunnel and forwards them to the appropriate communication device that initiated the content request.

In yet further embodiments, the gateway receives reply communications over the secured tunnel and forwards them to the mobile communication devices depending on a respective destination indicated by the reply communications from the remote communication device.

Note that the remote communication device supporting secured communications can be operated by any suitable entity. In one embodiment, the remote communication device is operated by a virtual private network service provider to which a user (such as a head-of-household user in a subscriber domain) of the one or more communication devices subscribes. As previously discussed, the remote communication device can be configured to forward communications received over the secured tunnel to destination addresses as specified by the communications.

In still further embodiments, selective forwarding of the received communications includes, via the gateway: analyzing attributes of the received communications; in response to detecting that a first portion of the received communications includes first attributes, forwarding the first portion of the received communications over the secured tunnel to the remote communication device; and in response to detecting that a second portion of the received communications includes second attributes, forwarding the second portion of the received communications over a bypass communication path to the remote network, the bypass communication path being an alternative communication path (such as the non-secure channel) with respect to the secured tunnel to the remote network.

In one embodiment, the so-called bypass communication path (a.k.a., non-secure channel providing direct access to the Internet) provides unsecured conveyance of the second portions of the received communications directly to the remote network such as the Internet instead of transmission over the secured tunnel.

Further embodiments herein include selectively forwarding the received communications over the secured tunnel depending on attributes such as: i) a source network address of the communication device sending a respective communication, ii) a destination network address to which the respective communication is transmitted, iii) a communication protocol used to transmit the respective communication, etc.

In accordance with more specific embodiments, configurations herein include retrieving data from a data field of a first data packet received from a first communication device of the mobile communication devices; mapping the retrieved data to an attribute setting associated with the first communication device; and responsive to matching the data to the attribute setting, forwarding the first data packet over the secured tunnel. In one embodiment, the attribute setting is part of a forwarding rule indicating which types of data packets are to be forwarded over the secured tunnel.

In yet further embodiments, the gateway includes a way in which an administrator of a subscriber domain controls handling of respective data packets associated with the different communication devices. For example, in one embodiment, a communication management resource of the gateway (that resides in the subscriber domain) receives input from an administrator overseeing a subscriber domain in which the multiple communication devices are registered to use the gateway. The input from the administrator specifies rules in which to forward communications over the shared communication link. The gateway selectively forwards the received communications over the secured tunnel in a manner as specified by the rules.

In one example embodiment, the forwarding rules indicate to forward communications transmitted in accordance with a particular communication protocol over the secured tunnel as opposed to forwarding such communications over a bypass path such as the non-secure channel directly to the remote network. In such an instance, in response to detecting that a first communication of the received communications is transmitted in accordance with a particular communication protocol, and the rules indicate to forward communications transmitted in accordance with the particular communication protocol over the secured tunnel, the gateway transmits the first communication over the secured tunnel.

Selective forwarding of the communications received by the gateway over the secured tunnel or the non-secure channel as described herein is useful because it enables one or more types of communications to be securely transmitted while others are transmitted over a non-secure communication link. In one embodiment, the gateway as described herein prevents undesirable activities such as censorship, tracking, advertisement monetization, etc., by service providers or other entities that have access to the communications conveyed over a network.

These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment includes a computer readable storage medium and/or system having instructions stored thereon to facilitate communications. The instructions, when executed by computer processor hardware, cause the computer processor hardware (such as one or more co-located or disparately located processor devices) to: establish a secured tunnel between gateway and a remote communication device over a shared communication link; establish a non-secured path between the gateway and a remote network over the shared communication link; receive communications from multiple communication devices, the communications destined for delivery to recipients in the remote network; and selectively forward the received communications over the secured tunnel and the non-secured path depending on attributes of the received communications.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 3 is an example diagram illustrating map information mapping users/communication devices to corresponding communication profiles according to embodiments herein.

Figure 1:
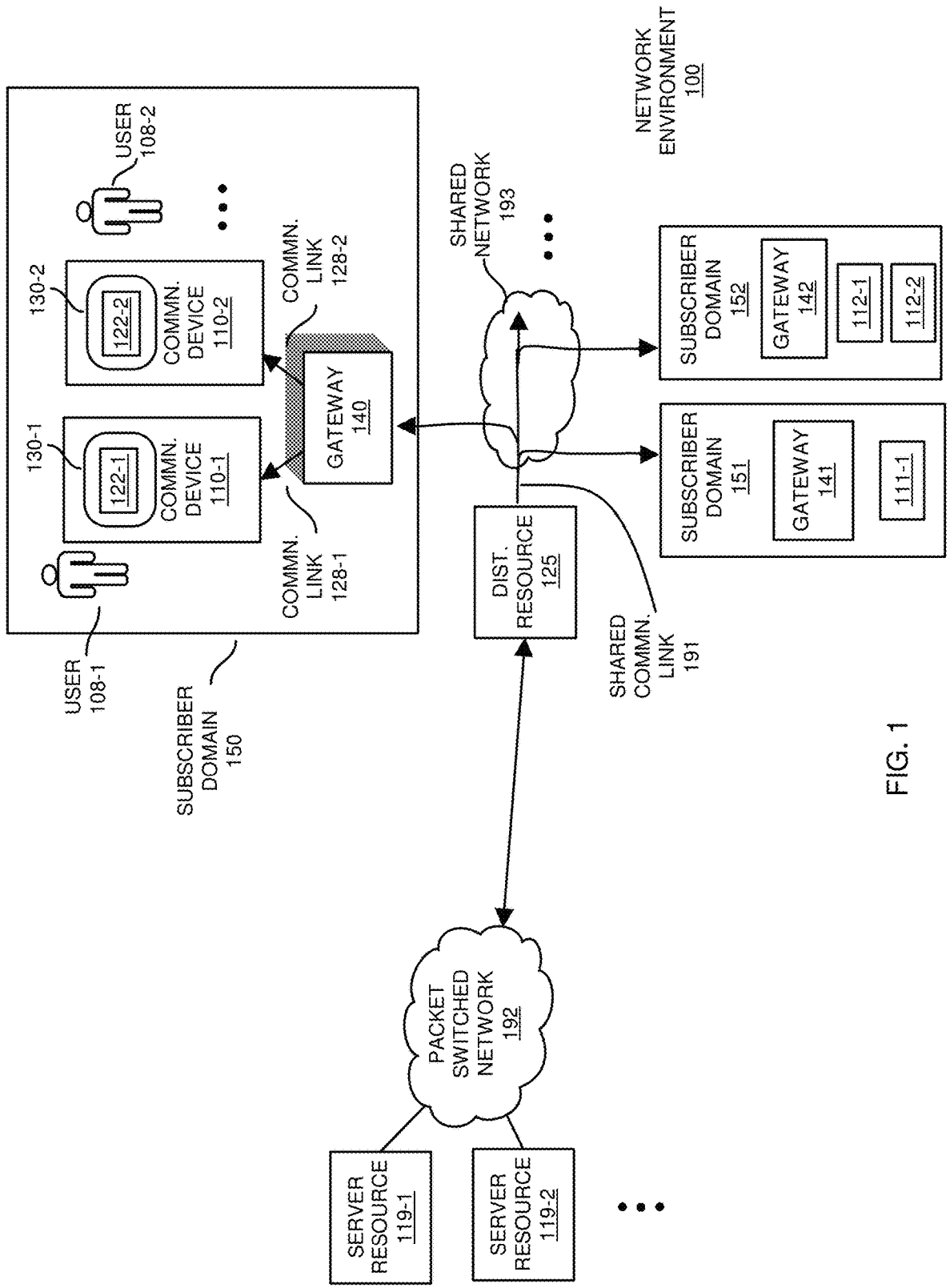
FIG. 1 is an example diagram illustrating control of communications through a gateway according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a gateway (such as associated with a router, computer device, etc., in a subscriber domain) provides access to a remote network. During operation, the gateway establishes a secured tunnel between the gateway and a remote communication device over a shared communication link. The gateway also establishes a non-secure channel over the shared communication link. The gateway analyzes communications received from multiple communication devices; the communications are destined for delivery to recipients in the remote network. Depending on attributes of the received communications, the gateway selectively forwards each of the received communications over the secured tunnel or the non-secure channel. Transmission of communications over the secured tunnel prevents eavesdropping on respective communications.

Now, more specifically, FIG. 1 is an example diagram illustrating a network environment supporting communications according to embodiments herein.

As shown, network environment 100 includes packet-switched network 192, shared network 193, server resources 119 (such as server resource 119-1, server resource 119-2, etc.), distribution resource 125, shared communication link 191, and multiple subscriber domains 150, 151, 152, etc.

In this example embodiment, each subscriber domain includes multiple communication devices operated by respective users. For example, in subscriber domain 150, user 108-1 operates communication device 110-1; user 108-2 operates communication device 110-2; and so on.

Each communication device 110 includes a respective display screen on which to display a rendition of retrieved. For example, communication device 110-1 includes respective display screen 130-1 on which to render (play back) retrieved content; communication device 110-2 includes respective display screen 130-2 on which to render (play back) retrieved content; and so on.

Each subscriber domain also includes a respective gateway. For example, subscriber domain includes gateway 140. As its name suggests, each gateway control a flow of respective data traffic into and out of a respective subscriber domain.

In this example embodiment, each of the communication devices 110 (communication device 110-1, communication device 110-2, etc.) in the subscriber domain 150 is in communication with the gateway 140 via a respective communication link (such as hard-wired or wireless communication link).

More specifically, communication link 128-1 supports communications between the communication device 110-1 and gateway 140; communication link 128-2 supports communications between the communication device 110-2 and gateway 140; and so on.

Yet further, during operation, gateway 140 (such as a router) provides each of the communication devices 110 in subscriber domain 150 access to shared communication link 191 (in network 193) and a remote network 192 such as the Internet or other network resources.

Note that, in a similar manner, subscriber domain 151 includes gateway 141 that provides respective one or more communication devices 111 access to the network 192 and corresponding resources via the shared communication link 191; subscriber domain 152 includes gateway 142 that provides respective one or more communication devices 112 (such as communication device 112-1, communication device 112-2, etc.) access to the network 192 and corresponding resources via shared communication link 191; and so on.

Accordingly, each of the subscriber domains 150, 151, 152, etc., and corresponding users and communication devices shares use of network 193 and corresponding shared communication link 191 to access the packet-switched network 192.

As further shown, the network environment 100 can be configured to include distribution resource 125. Shared communication link 191 provides connectivity between each of the subscriber domains and the distribution resource 125; the packet-switched network 192 provides further connectivity between the content distribution resource 125 and server resources 119.

Thus, in an upstream direction, the distribution resource 125 receives communications (such as requests for content) over the shared communication link 191 from the different gateways in the subscriber domains and forwards such communications over packet-switched network 192 to appropriate destinations (such as server resources 119). In a reverse direction (such as a downstream direction), via communications from sources such as server resources 119 over the packet-switched network 191, the distribution resource 125 forwards communications over shared communication link 191 to the gateways in the different subscriber domains in network environment 100.

Figure 2:
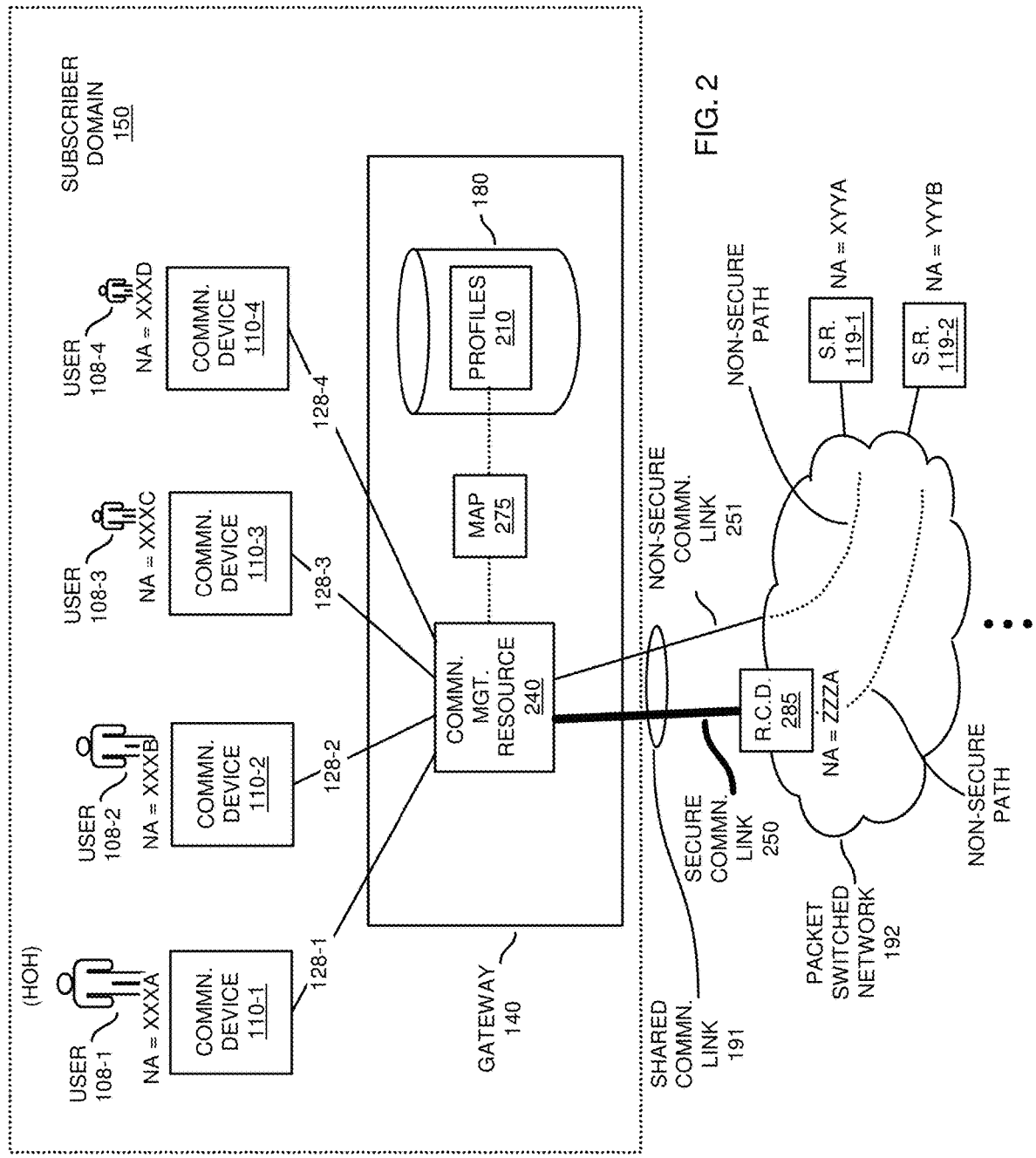
FIG. 2 is an example diagram illustrating implementation of a gateway in a subscriber domain according to embodiments herein.

FIG. 2 is an example diagram illustrating implementation of a gateway according to embodiments herein.

As previously discussed, embodiments herein include selective forwarding of communications received by the gateway over a secured channel (tunnel) or a non-secure channel as described herein. Such embodiments are useful because it enables one or more types of communications to be securely transmitted while others are transmitted over a non-secure communication link. In one embodiment, the gateway as described herein prevents undesirable activities such as censorship, tracking, advertisement monetization, etc., by service providers or other entities that have access to the communications conveyed over a network.

As shown in FIG. 2, the gateway 140 (such as implemented via hardware, software, or a combination of hardware and software) provides multiple communication devices 110 different types of access to the remote packet-switched network 192.

More specifically, the gateway 140 establishes a secured communication link 250 (such as a secured tunnel) between the gateway 140 and a remote communication device 285 over the shared communication link 191. In non-limiting example embodiment, establishing the secured communication link 250 with the remote communication device 285 includes communicating authentication information (such as password, username, etc.) associated with the subscriber domain 150 from the gateway 140 to the remote communication device 285.

As its name suggests, the secure communication link 250 supports secured communications between the gateway 140 and the remote communication device 285 over the shared communication link 191. In other words, the secure communication link 250 implements appropriate security processing to prevent contents of data packets from being inspected, viewed, analyzed, etc., by improper entities.

Note further that the gateway 140 also establishes a non-secured communication link 251 (such as a standard connection) between the gateway 140 and the packet-switched network 192 over the non-secure communication link 251. As its name suggests, the non-secure communication link 250 does not implement any extra level of security to prevent contents of data packets from being inspected by potentially malicious resources. Thus, via the non-secured communication link 251, the communication management resource 240 provides an alternative way (such as bypass path) of providing access to the network 192.

In one embodiment, the remote communication device 285 is operated by a virtual private network service provider to which a user 108-1 (such as a head-of-household in the subscriber domain 150) of the one or more communication devices 110 subscribes. The virtual private network service may be free or fee-based.

As previously discussed, the remote communication device 285 can be configured to forward communications received over the secured communication link 250 (secured tunnel) to destination addresses as specified by the outbound communications.

As further shown in FIG. 2, gateway 140 includes communication management resource 240, map information 275, and profiles 210 stored in repository 180. Such resources facilitate control of data flows to and from the communication devices 110 and shared communication link 191.

More specifically, as its name suggests, the map information 275 provides mapping between the communication devices/users in the subscriber domain 150 and respective forwarding rules (as specified by profiles 210) that are used to determine how to forward communications (as received from the communication devices 110) through the gateway 140 to the remote communication device 285.

As further discussed herein, note that each of the different communication devices/users can be assigned a different customized profile including information such as rules indicating how the gateway 140 is to forward (in either direction) respective communications (such as data packets) on behalf of the communication device/user.

In one example embodiment, in furtherance of providing access to the remote network 190, the gateway 140 analyzes communications received from each of the multiple communication devices 110. The communications are destined for delivery to recipients in the remote network 192.

Depending on attributes of the received communications from the communication devices 110, and forwarding rules as specified by the profiles 210 in repository 180, the gateway 110 selectively forwards each of the received communications over the shared communication link 250 to the remote communication device 285 or the non-secure communication link 251 directly to the remote network 192 such as the Internet.

Thus, each of the channels (secure communication link 250 or non-secured communication link 251) act as a bypass path with respect to the other.

Note that further embodiments herein include establishing the shared communication link 250 as a persistent virtual private network connection between the communication management resource 240 of the gateway 140 and the remote communication device 285. In such an instance, there is no delay using the secured communication link 250 to service a respective communication device.

In yet further embodiments, the gateway 140 encrypts any data packets (communications from the communication devices 110) destined for delivery over the shared communication link 250 to the remote communication device 285.

The remote communication 285 device receiving the encrypted data packets decrypts the encrypted communications and then acts as a proxy to distribute the decrypted communications (such as information or web page requests) to corresponding target destination addresses.

As yet further discussed herein, the gateway 140 supports selective forwarding of data packets. In one embodiment, selective forwarding of the received communications by the gateway 140 includes, via the gateway 140: analyzing attributes of the communications received from the mobile communication devices 110. In response to the communication management resource 240 (of gateway 140) detecting that a first portion (such as a first set of data packets) of the received communications from the communication devices includes first attributes, the communication management resource 240 forwards the first portion of the received communications over the secured communication link 250 to the remote communication device 285. In response to detecting that a second portion (such as a second set of data packets) of the received communications from the mobile communication devices 110 includes second attributes, the communication management resource 240 forwards the second portion of the received communications over the non-secured communication link (i.e., a bypass communication path) to the remote network 190.

Thus, the non-secured communication link 251 (bypass communication path) is an alternative communication path (such as a non-secure channel) with respect to the secured communication link 250 (secured tunnel) to the remote network 192. In such an instance, the bypass communication path (a.k.a., non-secure channel) provides unsecured conveyance of the second portion of the received communications directly to the remote network 192 such as the Internet instead of transmission over the secure communication link 250.

As previously discussed, the remote communication device 285 forwards original requests (as received over the secured communication link 250) for content (or other communications) received over the secured communication link 250 from the communication devices 110 to the appropriate destination address.

Note further that, in response to transmitting request messages on behalf of a respective communication device, the remote communication device 285 receives reply messages including requested content from the target destination address (server resources). To prevent other entities from viewing data associated with the content request, the remote communication device 285 encrypts the reply messages (received from a respective server resource) and forwards such encrypted reply messages over the secured communication link 250 to the communication management resource 240 in the gateway 140.

The communication management resource 240 of gateway 140 decrypts the received reply messages received over the secured tunnel and forwards them to the appropriate communication device that made the original content request. For example, the communication management resource 240 of gateway 140 receives reply communications over the secured communication link 250 and forwards them to the appropriate requesting mobile communication device 110 depending on a respective destination network address indicated by the reply communications as received from the remote communication device 285.

In this manner, the secured communication link 250 prevents snooping of conveyed data.

FIG. 3 is an example diagram illustrating mapping of users/communication devices to corresponding communication profiles according to embodiments herein.

As previously discussed, the map information 275 provides a mapping between each of the communication devices 110/users 108 and respective forwarding profiles.

For example, in this example embodiment, the map information 275 indicates that user Jane Doe operating communication device 110-1 (such as a computer device, personal device, mobile communication device, etc.) is assigned unique network address XXXA. Map information 275 provides mapping of the network address XXXA and corresponding communication device 110-1 and user 108-1/user to communication management profile 321.

Further in this example embodiment, the map information 275 indicates that user 108-2 (John Doe) operating communication device 108-2 (such as a computer device, personal device, mobile communication device, etc.) is assigned unique network address XXXB. Map information 275 provides mapping of the network address XXXB and corresponding communication device 110-2/user 108-2 to communication management profile 322.

Yet further, the map information 275 indicates that user 108-3 (James Doe) operating communication device 108-3 (such as a computer device, personal device, mobile communication device, etc.) is assigned unique network address XXXC. Map information 275 provides mapping of the network address XXXC and corresponding communication device 110-3/user 108-3 to communication management profile 323.

Still further, the map information 275 indicates that user 108-4 (Jill Doe) operating communication device 108-4 (such as a computer device, personal device, mobile communication device, etc.) is assigned unique network address XXXD. Map information 275 provides mapping of the network address XXXD and corresponding communication device 110-4/user 108-4 to communication management profile 324.

Figure 4:
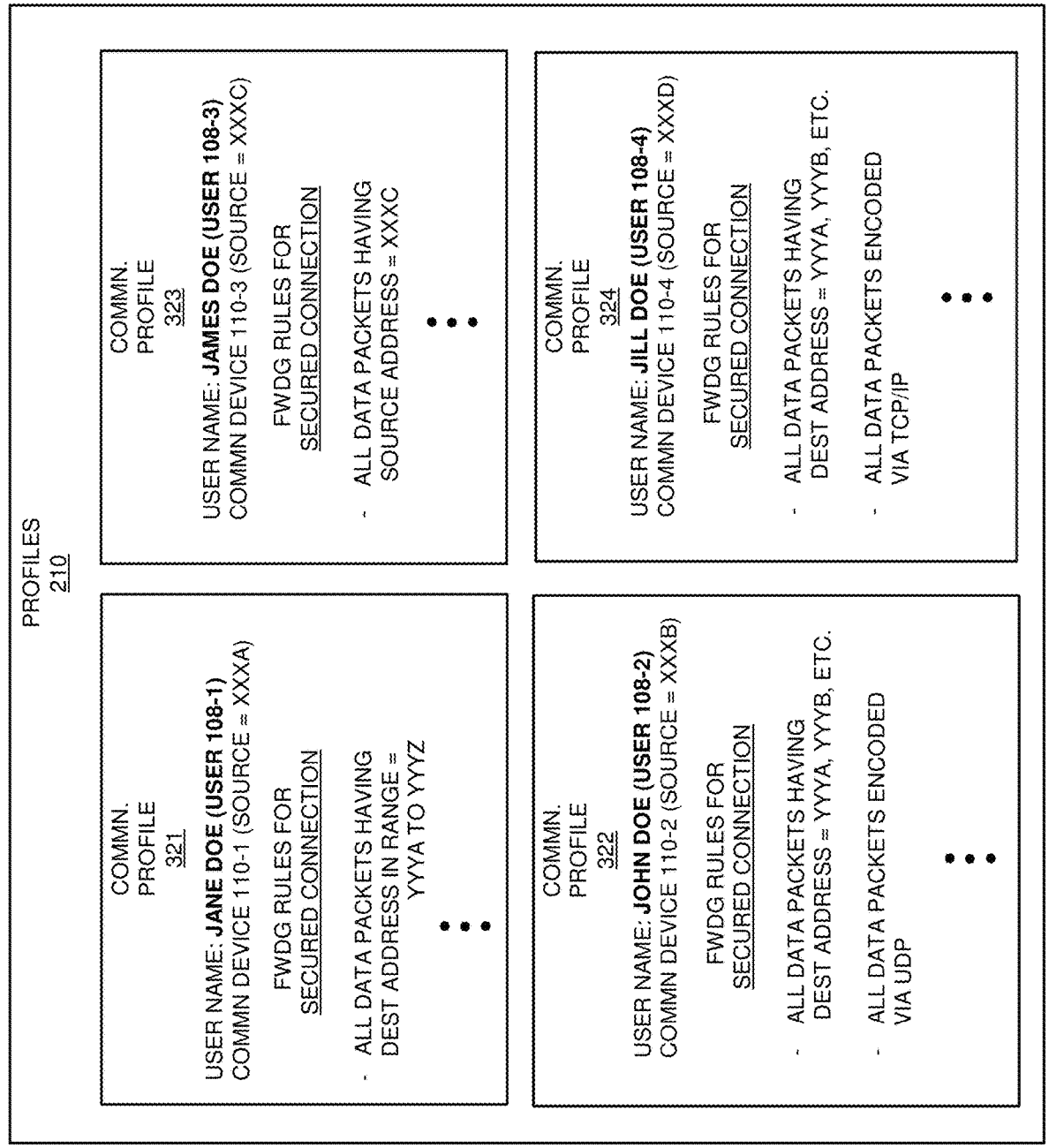
FIG. 4 is an example diagram illustrating communication profiles according to embodiments herein.

FIG. 4 is an example diagram illustrating communication profiles according to embodiments herein.

In one embodiment, the gateway 140 enables an administrator to control handling of respective data packets associated with the different communication devices.

For example, in one embodiment, a communication management resource 240 of the gateway 140 receives input from an administrator (such as user 108-1) overseeing a subscriber domain 150 in which the multiple communication devices are registered to use the gateway 140. The input from the administrator specifies settings of the gateway 140 such as rules in which to forward communications over the shared communication link 191. The gateway 140 selectively forwards the received communications over the secured tunnel in a manner as specified by the rules.

In this example embodiment, the communication profile 321 assigned to the user 108-1 indicates that all data packets (outbound communications from the communication device 110-1) having a destination address that falls within the network address range YYYA and YYYZ are be forwarded over the secured communication link 250 instead of non-secured communication link 251.

The communication profile 322 assigned to the user 108-2 indicates that all data packets (outbound communications from the communication device 110-1) having a destination address that have a value YYYA, YYYB, etc., or data packets that are encoded in accordance with the UDP protocol are to be transmitted over the secured communication link 250 instead of non-secured communication link 251.

The communication profile 323 assigned to the user 108-3 indicates that all data packets (outbound communications from the communication device 110-3) having a source address of XXXC are to be transmitted over the secured communication link 250 instead of non-secured communication link 251.

The communication profile 324 assigned to the user 108-4 indicates that all data packets (outbound communications from the communication device 110-4) having a destination address that have a value YYYA, YYYB, etc., or data packets that are encoded in accordance with the TCP/IP protocol are to be transmitted over the secured communication link 250 instead of non-secured communication link 251.

Via the respective profile information associated with a communication device, the administrator can assign any communication management rules.

Figure 5:
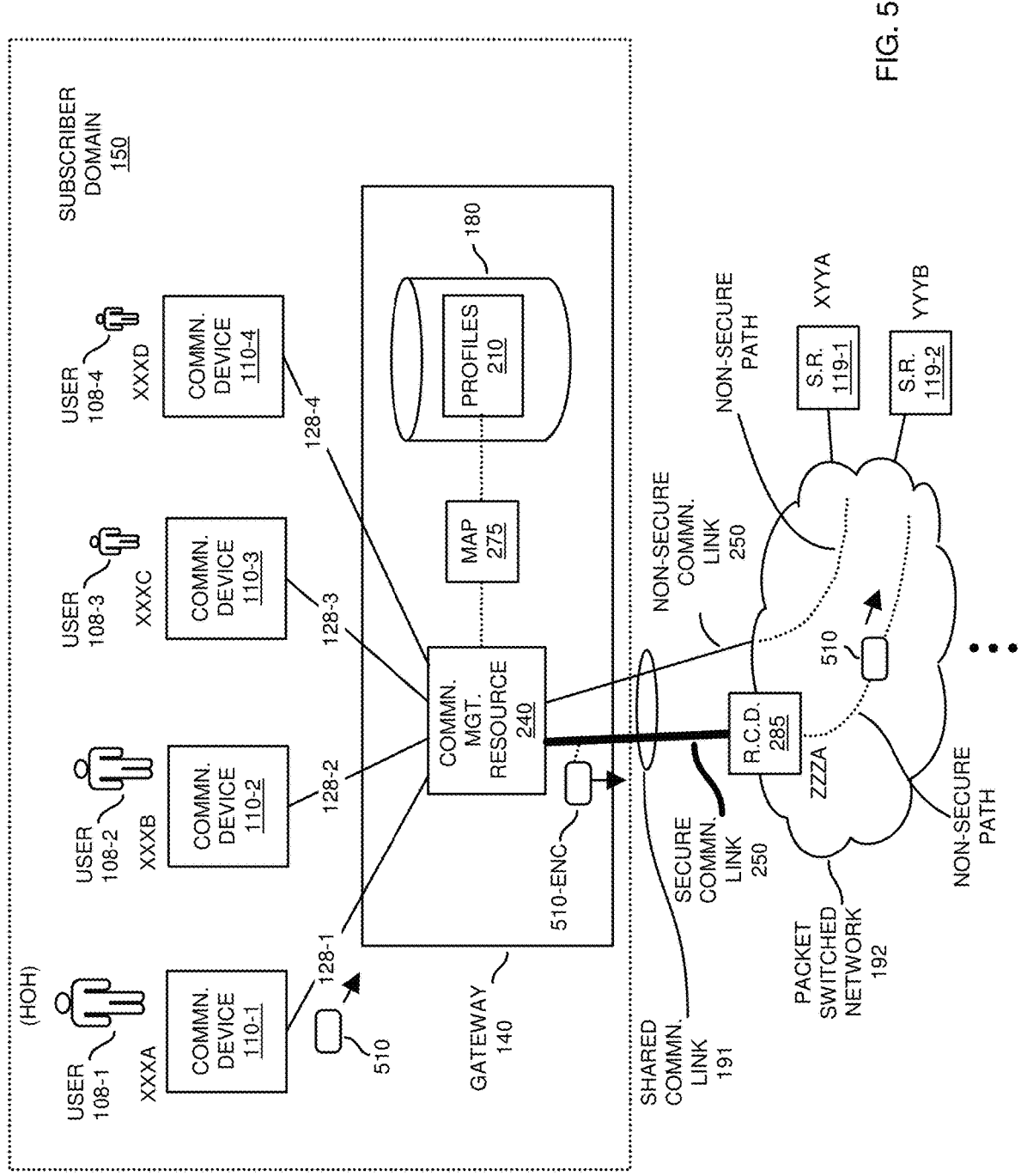
FIG. 5 is an example diagram illustrating forwarding of a first communication from a communication device through a gateway resource and a secured tunnel according to embodiments herein.

FIG. 5 is an example diagram illustrating forwarding of a first communication from a communication device through a gateway resource according to embodiments herein.

In this example embodiment, assume that the communication management resource 240 receives the communication 510 over communication link 128-1 from the communication device 110-1 assigned unique network address XXXA.

In response to receiving the communication 510, the communication management resource 240 analyzes the communication 510 and determines, via inspection of a data field storing the source address, that the data packet is received from the communication device 110-1 and has a source network address of XXXA. Assume further that the communication management resource 240, via analysis, detects that the communication 510 has a destination network address of YYYA (server resource 119-1).

As previously discussed, embodiments herein selectively forwarding the communications received from one or more communication devices 110 over the secured tunnel depending on attributes such as a source network address of the communication device sending a respective communication, a destination network address to which the respective communication is transmitted, a communication protocol used to transmit the respective communication, etc.

In furtherance of receiving the communication 510, the communication management resource 240 maps the source network address to an appropriate profile. For example, one embodiment herein includes retrieving data (source network address XXXA) from a respective data field of the communication 510 (such as a data packet) received from the communication device 110-1. The communication management resource 240 maps the retrieved data (XXXA) to profile 321 associated with the communication device 110-1. The communication management resource 240 further retrieves the destination network address YYYA from the communication 510 and compares it to the forwarding rules associated with profile 321. In this instance, the communication management resource 240 detects from the profile 321 that the communication 510 is to be transmitted over the secured communication link 250 because the destination network address YYYA matches an attribute setting of destination network address YYYA in the respective forwarding rules of profile 321.

The communication management resource 240 then forwards the communication 510-EN (such as communication 510 encrypted or encapsulated to protect privacy of the user 108-1) over the secured communication link 250 to the remote communication device 285. Remote communication device 285, having a decryption key, decrypts the communication 510-EN into its original form from the communication device 110-1 and forwards it (communication 510) over network 192 to the appropriate destination (server resource 119-1).

Figure 6:
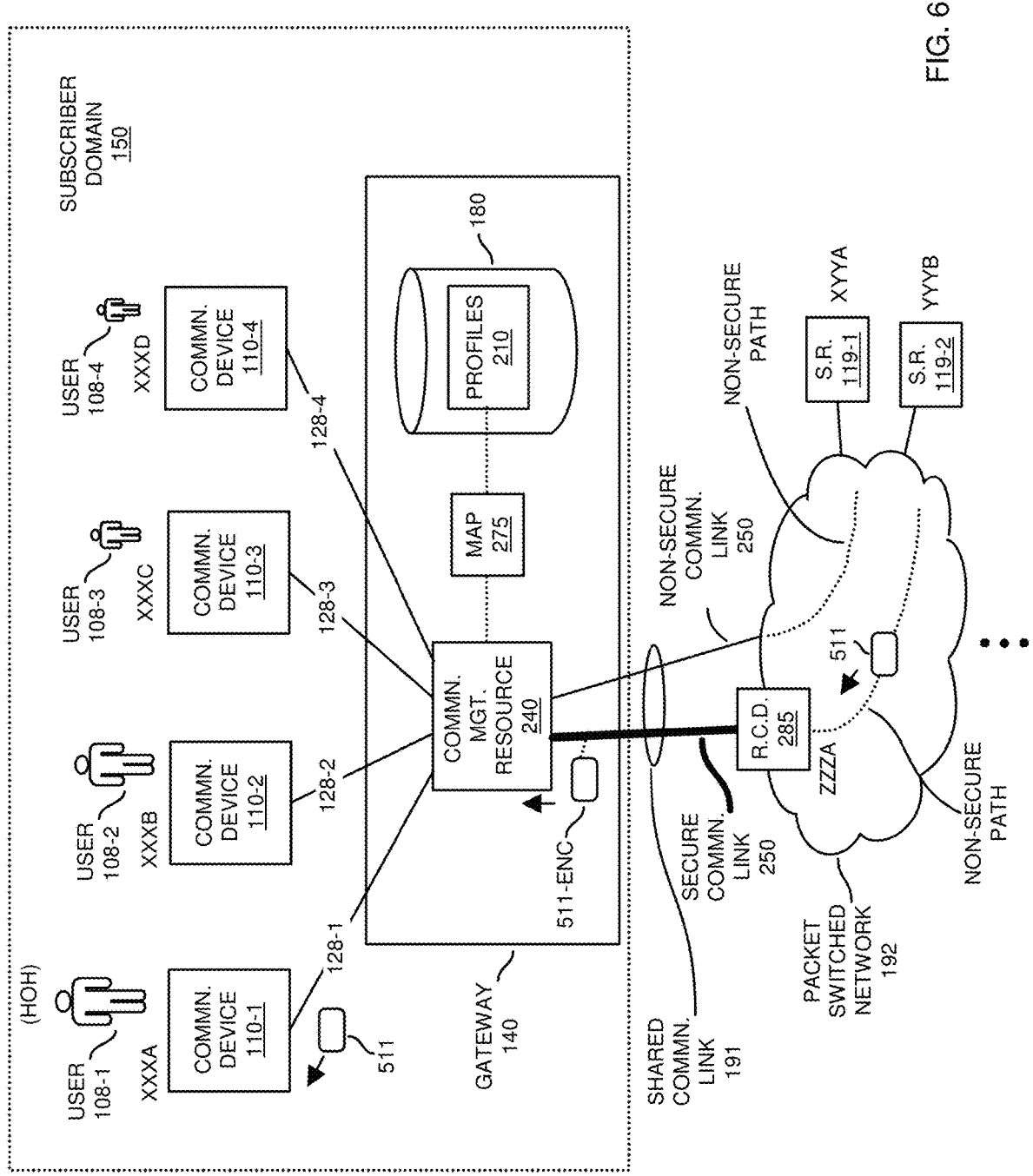
FIG. 6 is an example diagram illustrating routing of a reply message through a secured tunnel and the gateway resource to a target communication device according to embodiments herein.

FIG. 6 is an example diagram illustrating routing of a reply message through the gateway resource to a target communication device according to embodiments herein.

In response to receiving the communication 510, the server resource 119-1 communicates a respective response message (media such as one or more data packets associated with a web page, video, etc.) over a non-secure path in network 192 to the remote communication device 285.

Remote communication device 185 encrypts received reply communication 511 as communication 511-EN and forwards communication 511-EN over the secured communication link 250 to the communication management resource 240. Communication management resource 240 decrypts the received reply communication 511-EN and forwards the original reply communication 511 to the respective browser application of the communication device 110-1 for rendering.

As previously discussed, the rules associated with a user profile can be configured to indicate to forward communications transmitted in accordance with a particular communication protocol over the secured communication link 250 as opposed to forwarding such communications over a bypass path such as the non-secured communication link 251 directly to the remote network. In such an instance, in response to detecting that a particular communication from a communication device 110-2 is transmitted in accordance with a particular communication protocol UDP (User Datagram Protocol), and the rules (such as associated with profile 322) indicates to forward communications transmitted in accordance with the particular communication protocol UDP over the secured communication link 250, the gateway transmits the particular communication from the communication device 110-2 over the secured communication link 250 to the remote communication device 285 for appropriate delivery.

Figure 7:
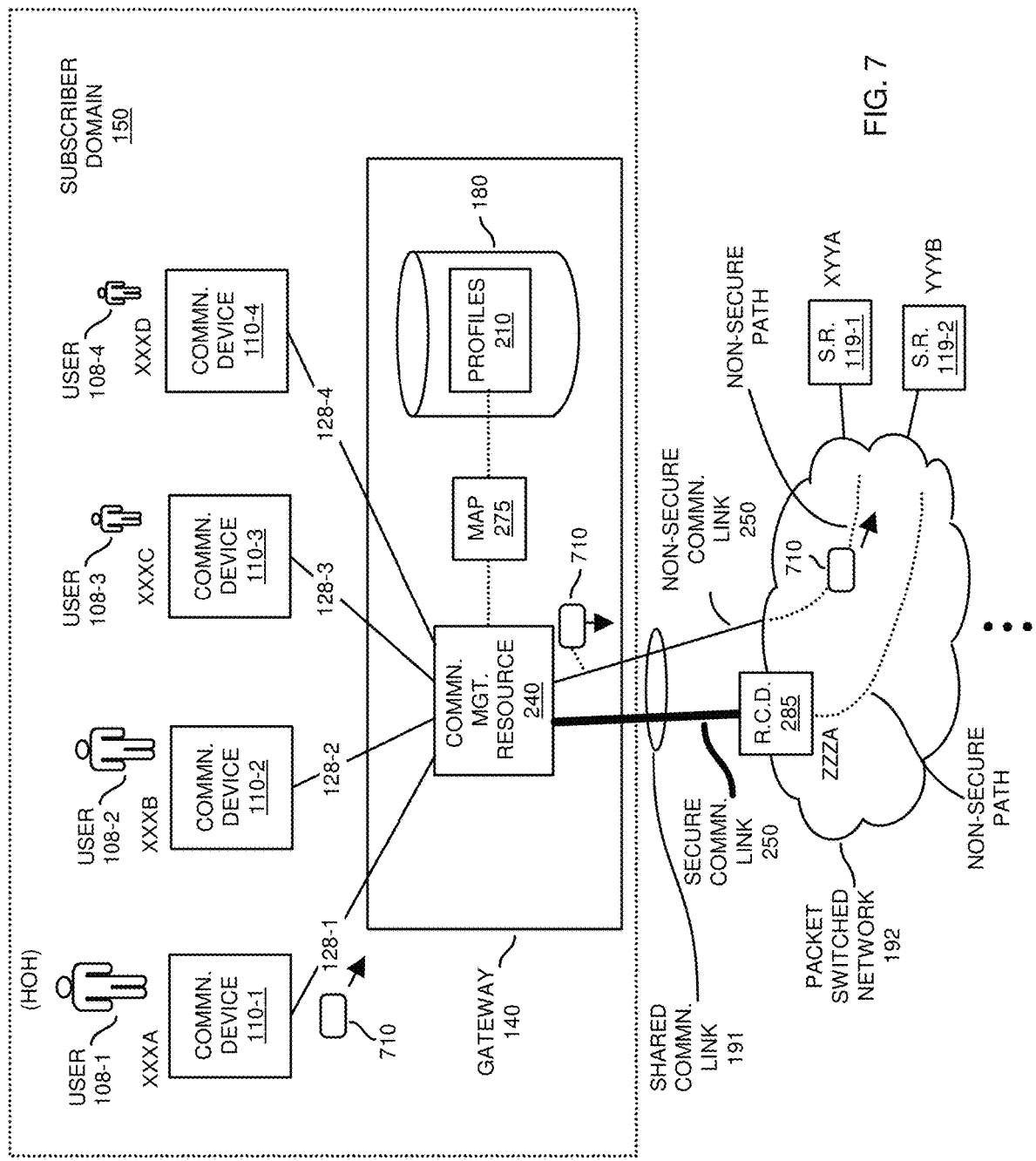
FIG. 7 is an example diagram illustrating forwarding of a second communication from a remote communication device through a gateway resource and a non-secure communication path according to embodiments herein.

FIG. 7 is an example diagram illustrating forwarding of a second communication from a communication device through a gateway resource according to embodiments herein.

In this example embodiment, the communication device 110-1 communicates communication 710 to gateway 140 for retrieval of content from then 192.

In a similar manner as previously discussed, the communication management resource 240 analyzes attributes of the received communication 710 to determine how to forward the respective communication 710. Assume that the communication has a source network address of XXXA and a destination network address of XYYA (such as server resource 119-1).

In such an instance, the communication management resource 240 uses the profile 321 associated with the user 108-1 that the unique network address does not fall in the network address range between YYYA and YYYZ. Because the unique network address XYYA falls outside the range associated with profile 321, the communication management resource 240 bypasses the secured communication link 250 and forwards the communication 710 (unencrypted or non-secured) over the non-secured communication link 251 to the server resource 119-1.

Figure 8:
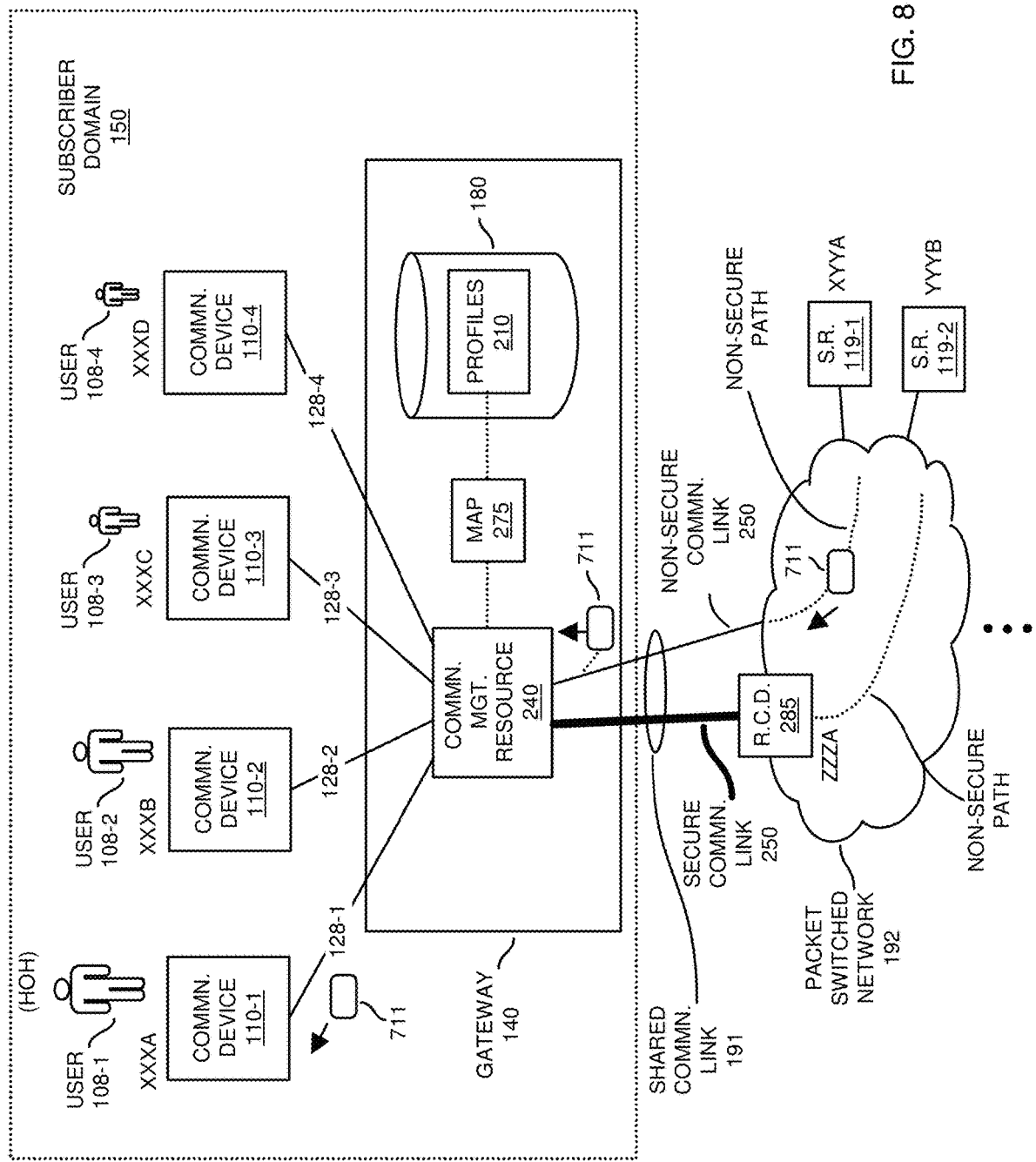
FIG. 8 is an example diagram illustrating routing of a reply message through a non-secure communication path to a target communication device according to embodiments herein.

FIG. 8 is an example diagram illustrating routing of a reply message through the gateway resource to a target communication device according to embodiments herein.

In response to receiving the communication 710, the server resource 119-1 communicates the reply communication 711 over network 192 and non-secured communication link 251 to the communication management resource 240. Communication management resource 240 forwards the communication 710 over communication link 128-1 to the communication device 110-1.

Figure 9:
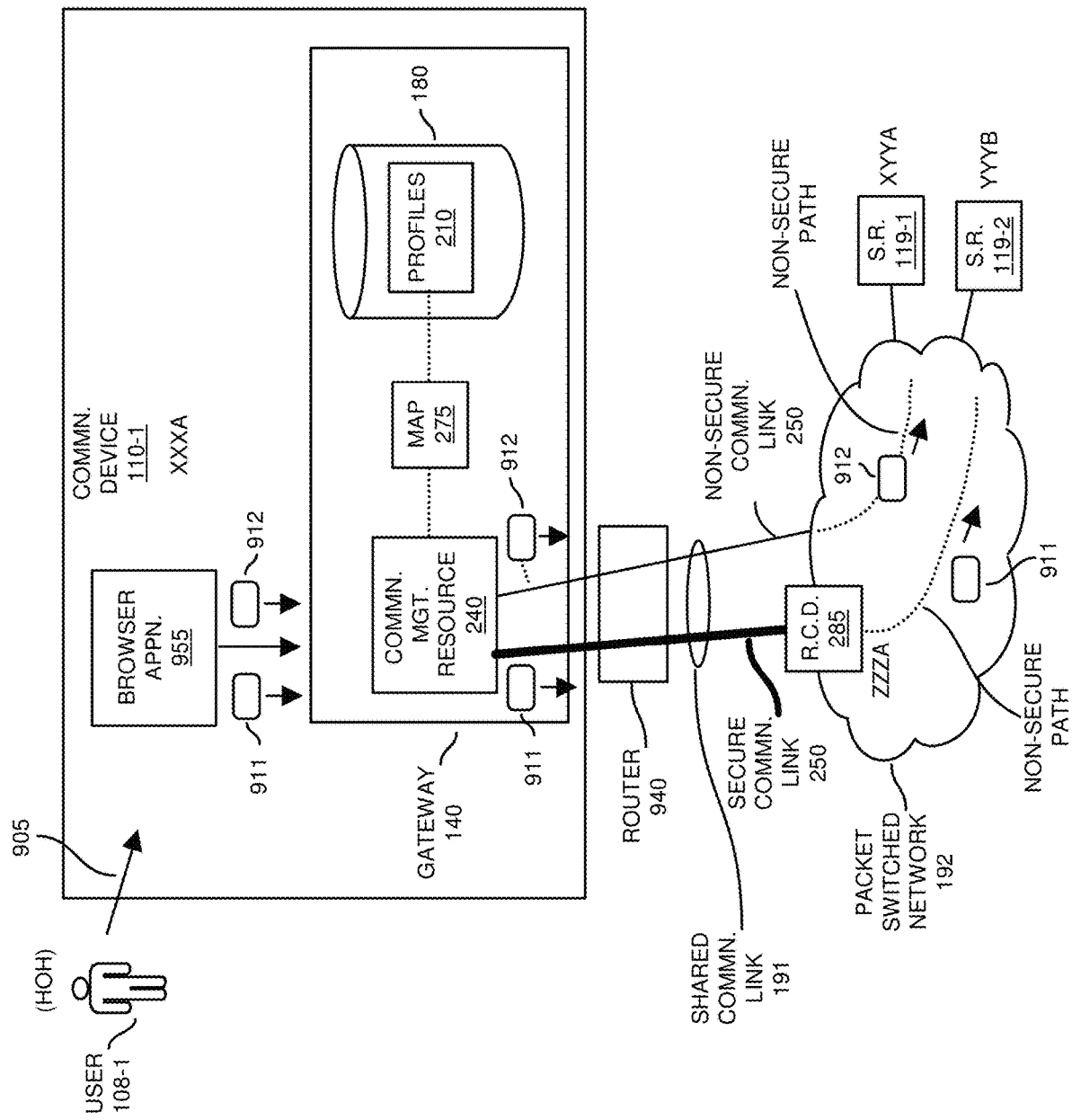
FIG. 9 is an example diagram illustrating implementation of a gateway resource in a communication device according to embodiments herein.

FIG. 9 is an example diagram illustrating implementation of a gateway resource in a communication device according to embodiments herein.

Note that the gateway 140 can be implemented in any suitable resource. In one embodiment, as previously discussed, the gateway 140 is implemented as a standalone/central entity with respect to each of the multiple communication devices 110.

Alternatively, as shown in FIG. 9, the gateway 140 can be implemented in a respective communication device 110-1. In such an instance, the communication device 110-1 communicates through router 940 of a respective subscriber domain, which is connected to the packet-switched network 192. In other words, the router 940 is a portal providing access to the network 192.

As further shown, the communication device 110-1 executes a browser application 955.

Assume that the browser application 955, based on input from the user 108-1, generates one or more requests for content from server resources 119. For example, assume that the browser application 955 generates a first request such as captured by communication 911. In similar manner as previously discussed, the gateway 140 receives the communication 911 from browser application 955. Depending upon the corresponding profile associated with the user 108-1, the gateway 140 (and more specifically the communication management resource 240 of gateway 140) determines which of multiple communication paths (either communication link 250 or non-secured communication link 251) in which to forward the communication 911 to the packet-switched network 192.

In this instance, assume that the communication management resource 240 determines that, from a destination network address assigned to the communication 911, that the communication should be communicated over the secure communication link 250 to the remote communication device 285. In such an instance, the communication management resource 240 transmits the communication 911 to the remote communication device 285 over the secure communication link 250. As previously discussed, the remote communication device 285 then forwards the respective communication 911 to the appropriate server resource 119.

In a reverse direction, the target server resource provides a respective response (such as web page information) to the remote communication device 285, that forwards such response communications over the secure communication link 250 to the communication manager resource 240. The communication manager resource 140 forwards the response to browser application 955 for display. In this manner, the local gateway 140 instantiated directly in the communication device 110-1 provides select forwarding of communications.

As an example, assume that the browser application 955 generates a second request such as captured by communication 912. In similar manner as previously discussed, the gateway 140 receives the communication 912 from browser application 955. Depending upon the corresponding profile associated with the user 108-1, the gateway 140 (and more specifically the communication management resource 240 of gateway 140) determines which of multiple communication paths (either communication link 250 or non-secured communication link 251) in which to forward the communication 912 to the packet-switched network 192.

In this instance, assume that the communication management resource 240 determines that, from a destination network address assigned to the communication 912, that the communication should be communicated over the non-secured communication link 251 to the network 192, by passing the secured communication link 250. In such an instance, the communication management resource 240 transmits the communication 912 directly to the network 192 for retrieval of respective content (such as a web page). Assuming that server resource 119-1 receives the communication 912 and corresponding request, the server resource 119-1 communicates an appropriate response over the non-secured communication link 251 to the communication management resource 240 that, in turn, communicates the response to the browser application 955 for rendering of the respective requested content.

Note further that the gateway 140 can be configured as an Internet router supporting IPv4 and IPv6, fire walling, routing and NAT (Network Address Translation) with enhanced privacy-related controls to prevent monitoring traffic patterns and content by a local network service provider (such as ISP). As previously discussed, the gateway 140 can be configured to one or more VPN connections to tunnel traffic to a privacy-focused VPN provider (such as remote communication device 285) based on user-select criteria. Such embodiments help prevent censorship, tracking, and advertisement monetization by service providers and governments.

In accordance with further embodiments, the IPv4 based routing, firewall, and NAT functionality can be built-in to the gateway 140. One or more network addresses can be configured on a respective WAN interface of the gateway 140 to provide net capabilities to LAN addresses. The gateway 140 also supports utilizing more than one IPv4 addresses for clients that are not network address translated. In such cases, firewall functionality will be used to protect the LAN clients.

In yet further embodiments, IPv6-based routing firewall functionality is built in the gateway 140 to support prefix delegation in all open standards-based IPv6 to IPV for translation methods. All IPv6 traffic passes through a firewall.

The router (gateway 140) will provide traditional services such as DHCP (Dynamic Host Configuration Protocol), DNS (Domain Name Server), and NTP, etc. in the case of DNS, will act as a full recursion service and is not dependent upon any existing DNS provider's service. The device (gateway 140) can be configured to support tunneling the DNS recursion through one or more VPN (Virtual Private Network) tunnels.

This further discussed herein, privacy-based features of the gateway 140 can be enabled and disabled by the user/device owner at any time. Privacy protections can be configured based on domain names, source IPv4-IPv6 addresses, destination IPv4-IPv6 addresses, LAN MAC addresses, wired versus wireless clients, IP protocols and proto-board numbers.

Privacy protections of the gateway 140 can be enabled using VPN services, TOR, I2P, and the features can be stacked to run, for example, I2P over one VPN provider (such as via a first remote communication device 285 operated by a first service provider) for all traffic destined to a specific or group of domain names, while traffic from a specific MAC addresses are tunnel through a second VPN provider (such as via a second rendition of remote communication device 285 operated by a second service provider) and traffic to a third domain name is tunneled through a TOR over a third VPN provider (such as via a third rendition of remote communication device 285 operated by a third service provider).

IPv4 and IPv6 address groups can be built based on IP owners and geographic distribution. Domain groups can be built based on owners, functionality, or classification (such as social networking).

Additional protections against tracking by web advertising and hosting companies can be provided (via the gateway 140) with domain and IP-based filters that filter o cookies, JavaScript™, and HTML (Hypertext Markup Language) elements destined for the respective communication device.

Figure 10:
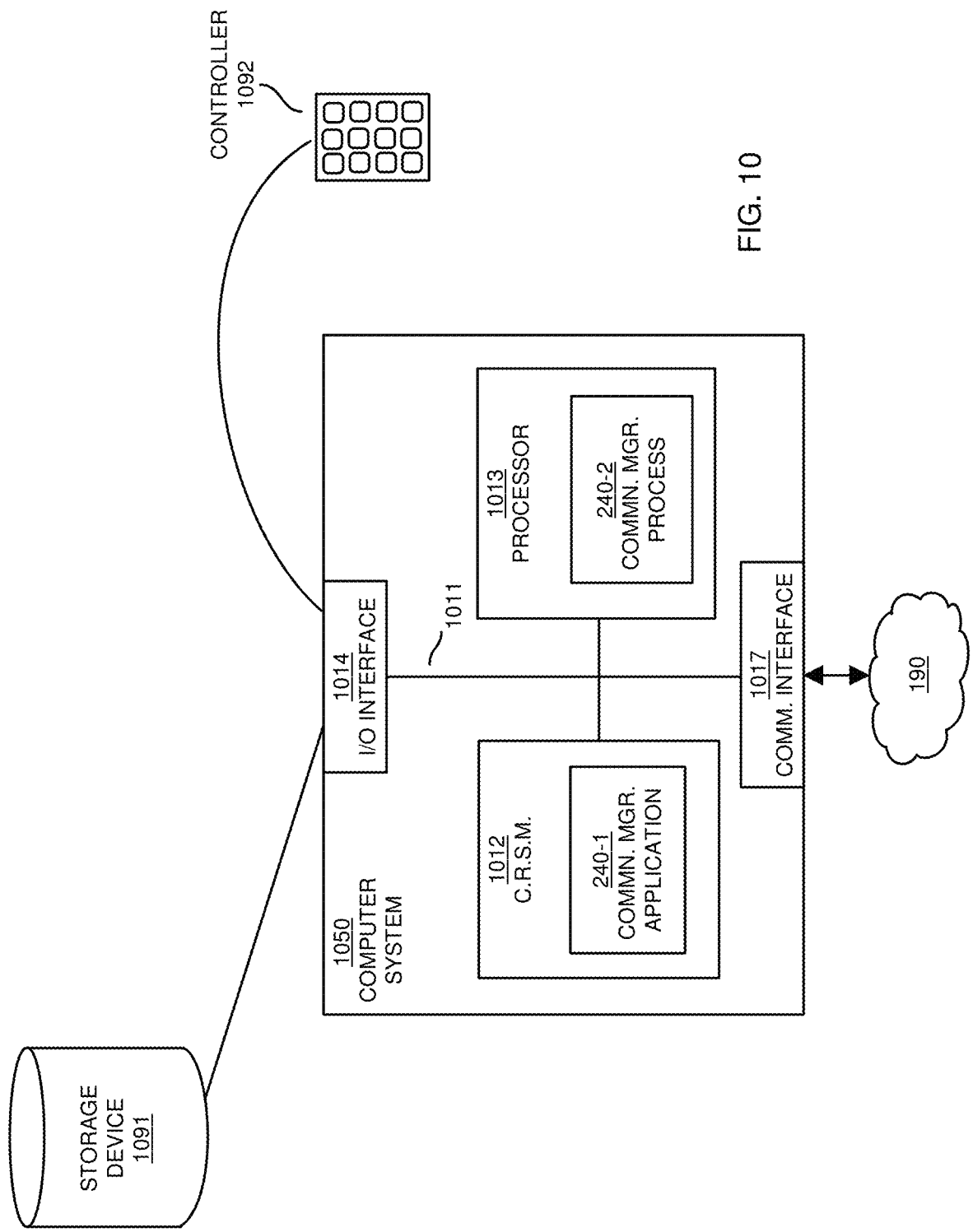
FIG. 10 is a diagram illustrating an example computer architecture to execute one or more operations according to embodiments herein.

FIG. 10 is an example block diagram of a computer system for implementing any of the operations as discussed herein according to embodiments herein.

Note that any of the resources (such as gateway 140, communication devices 110, remote communication device 285, communication management resource 240, etc.) as discussed herein can be configured to include computer processor hardware and corresponding executable instructions to carry out the different operations as discussed herein.

As shown, computer system 1050 of the present example can include an interconnect 1011 that couples computer readable storage media 1012 such as a non-transitory type of media (i.e., any type of hardware storage medium) in which digital information can be stored and retrieved, a processor 1013, I/O interface 1014, and a communications interface 1017.

I/O interface 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in management application 140-1 stored on computer readable storage medium 1012. Execution of the management application 140-1 produces playback process 140-2 to carry out any of the operations and/or processes as discussed herein.

Those skilled in the art will understand that the computer system 1050 can include other processes and/or software and hardware components, such as an operating system that controls allocation and use of hardware resources to playback application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 11:
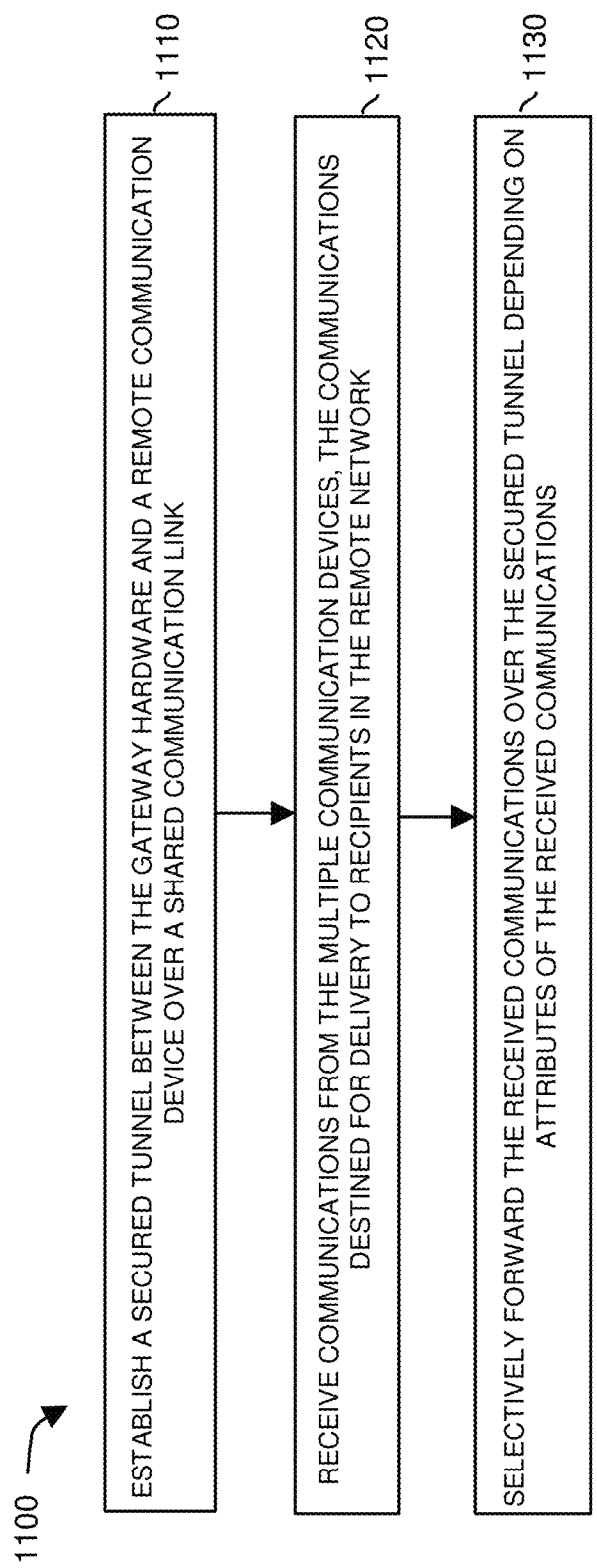
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, the communication management resource 240 establishes a secured communication link 191 (secured tunnel) between the gateway 140 and a remote communication device 280 over a shared communication link 191.

In processing operation 1120, the communication management resource 240 receives communications from the multiple communication devices 110; the communications (such as data packets, data payloads, etc.) are destined for delivery to recipients (such as one or more server resources 119) in the remote network 190 (such as the Internet).

In processing operation 1130, the communication management resource 240 selectively forwards the received communications over the secured tunnel depending on attributes (such as destination address, source address, communication protocol, etc.) of the received communications.

Note again that techniques herein are well suited to facilitate dynamic distribution of communications over secured and non-secured communication links in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
via gateway hardware providing multiple communication devices access to a remote network:
establishing a secured tunnel between the gateway hardware and a remote communication device over a shared communication link;
receiving communications from the multiple communication devices, the communications destined for delivery to recipients in the remote network; and
selectively forwarding the received communications over the secured tunnel and a bypass communication path depending on attributes of the received communications.

2. The method as in claim 1 further comprising:
establishing the secured tunnel as a persistent virtual private network connection between the gateway hardware and the remote communication device.

3. The method as in claim 1, wherein the remote communication device is operated by a virtual private network service provider that forwards communications received over the secured tunnel to destination addresses as specified by the communications.

4. The method as in claim 1 further comprising:
receiving input from an administrator overseeing a subscriber domain in which the multiple communication devices are registered to use the gateway hardware, the input specifying rules in which to forward communications over the shared communication link; and
wherein selectively forwarding the received communications over the secured tunnel includes: selectively transmitting the received communications in accordance with the rules.

5. The method as in claim 1 further comprising:
in response to detecting that a first communication of the received communications is transmitted in accordance with a particular communication protocol, transmitting the first communication over the secured tunnel instead of the bypass communication path.

6. The method as in claim 1 further comprising:
receiving reply communications over the secured tunnel;
forwarding the reply communications to the mobile communication devices depending on a respective destination indicated by the reply communications.

7. The method as in claim 1, wherein the bypass communication path is a non-secured communication channel in the shared communication link, the method further comprising:
establishing the non-secured communication channel between the gateway hardware and the remote network;
communicating a first portion of the received communications over the secured tunnel of the shared communication link; and
communicating a second portion of the received communications over the non-secured communication channel established in the shared communication link.

8. The method as in claim 1, wherein selectively forwarding the received communications over the secured tunnel and the bypass communication path depending on attributes of the received communications includes:
forwarding the received communications over the secured tunnel and the bypass communication path depending on a respective source network address of each of the received communications.

9. The method as in claim 1, wherein selectively forwarding the received communications over the secured tunnel and the bypass communication path depending on attributes of the received communications includes:
forwarding the received communications over the secured tunnel and the bypass communication path depending on a respective destination network address of each of the received communications.

10. The method as in claim 1, wherein the received communications include first communications and second communications; and
wherein selectively forwarding the received communications over the secured tunnel and the bypass communication path depending on attributes of the received communications includes: i) communicating the first communications over the secured tunnel in response to detecting that destination network addresses associated with the first communications fall within a network address range, and ii) communicating the second communications over the bypass communication path in response to detecting that destination network addresses associated with the second communications fall outside the network address range.

11. The method as in claim 1, wherein selectively forwarding the received communications over the secured tunnel and the bypass communication path depending on attributes of the received communications includes:
forwarding the received communications over the secured tunnel and the bypass communication path depending on a communication protocol in which the received communications are encoded.

12. The method as in claim 1 further comprising:
decrypting received reply messages received over the secured tunnel; and
forwarding the decrypted reply messages to a respective communication device of the multiple communication devices that requested content in the reply messages.

13. The method as in claim 1, wherein the secured tunnel is a first secured tunnel, wherein the remote communication device is a first remote communication device, wherein the bypass communication path is a first bypass communication path, the method further comprising:
establishing a second secured tunnel between the gateway hardware and a second remote communication device over the shared communication link; and
selectively forwarding the received communications over the first secured tunnel, the second secured tunnel, and the bypass communication path depending on attributes of the received communications.

14. The method as in claim 13, wherein selectively forwarding the received communications includes:
communicating first received communications over the first secured tunnel in response to detecting that the first received communications are associated with a first service provider; and
communicating second received communications over the second secured tunnel in response to detecting that the second received communications are associated with a second service provider.

15. A method comprising:
via gateway hardware providing multiple communication devices access to a remote network:

establishing a secured tunnel between the gateway hardware and a remote communication device over a shared communication link;

receiving communications from the multiple communication devices, the communications destined for delivery to recipients in the remote network; and selectively forwarding the received communications over the secured tunnel depending on attributes of the received communications; and wherein selectively forwarding the received communications over the secured tunnel depending on attributes of the received communications includes: analyzing the attributes of the received communications; in response to detecting that a first portion of the received communications includes first attributes, forwarding the first portion of the received communications over the secured tunnel to the remote communication device; and in response to detecting that a second portion of the received communications includes second attributes, forwarding the second portion of the received communications over a bypass communication path to the remote network, the bypass communication path being an alternative communication path with respect to the secured tunnel to the remote network.

16. The method as in claim 15, wherein the bypass communication path provides unsecured conveyance of the second portions of the received communications.

17. A method comprising:

via gateway hardware providing multiple communication devices access to a remote network:

establishing a secured tunnel between the gateway hardware and a remote communication device over a shared communication link;

receiving communications from the multiple communication devices, the communications destined for delivery to recipients in the remote network; and selectively forwarding the received communications over the secured tunnel depending on attributes of the received communications; and wherein selectively forwarding the received communications over the secured tunnel depending on the attributes of the received communications includes: retrieving data from a data field of a first data packet received from a first communication device of the mobile communication devices; mapping the data to an attribute setting associated with the first communication device; and responsive to matching the data to the attribute setting, forwarding the first data packet over the secured tunnel.

18. The method as in claim 17, wherein the attribute setting is a network address.

19. A system comprising:

a shared communication link; and gateway hardware coupled to the shared communication link, the gateway hardware operative to:

provide multiple communication devices access to a remote network:

establish a secured tunnel between the gateway hardware and a remote communication device over a shared communication link;

receive communications from the multiple communication devices, the communications destined for delivery to recipients in the remote network; and selectively forward the received communications over the secured tunnel and a bypass communication path depending on attributes of the received communications.

20. The system as in claim 19, wherein the gateway hardware is further operative to:

establish the secured tunnel as a persistent virtual private network connection between the gateway hardware and the remote communication device.

21. The system as in claim 19, wherein the remote communication device is operated by a virtual private network service provider that forwards communications received over the secured tunnel to destination addresses as specified by the communications.

22. The system as in claim 19, wherein the gateway hardware is further operative to:

analyze attributes of the received communications;

in response to detecting that a first portion of the received communications includes first attributes, forward the first portion of the received communications over the secured tunnel to the remote communication device; and in response to detect that a second portion of the received communications includes second attributes, forwarding the second portion of the received communications over the bypass communication path to the remote network, the bypass communication path being an alternative communication path with respect to the secured tunnel to the remote network.

23. The system as in claim 22, wherein the bypass communication path provides unsecured conveyance of the second portions of the received communications.

24. The system as in claim 19, wherein the gateway hardware is further operative to:

retrieve data from a data field of a first data packet received from a first communication device of the mobile communication devices;

map the data to an attribute setting associated with the first communication device; and responsive to matching the data to the attribute setting, forward the first data packet over the secured tunnel.

25. The system as in claim 24, wherein the attribute setting is a network address.

26. The system as in claim 19, wherein the gateway hardware is further operative to:

receive input from an administrator overseeing a subscriber domain in which the multiple communication devices are registered to use the gateway hardware, the input specifying rules in which to forward communications over the shared communication link; and selectively transmit the received communications in accordance with the rules.

27. The system as in claim 19, wherein the gateway hardware is further operative to:

in response to detecting that a first communication of the received communications is transmitted in accordance with a particular communication protocol, transmit the first communication over the secured tunnel.

28. The system as in claim 19 further comprising:

receive reply communications over the secured tunnel; and forward the reply communications to the mobile communication devices depending on a respective destination indicated by the reply communications.

29. The system as in claim 19, wherein the bypass communication path is a non-secured communication channel; and wherein the gateway hardware is further operable to:
establish the non-secured communication channel in the shared communication link between the gateway hardware and the remote network;
communicate a first portion of the received communications over the secured tunnel of the shared communication link; and
communicate a second portion of the received communications over the non-secured communication channel established in the shared communication link.

30. The system as in claim 19, wherein the remote communication device has a decryption key, the remote communication device operative to decrypt messages received over the secured tunnel and forward the decrypted communications to the recipients.

31. Computer-readable storage hardware having instructions stored thereon, the instructions, when carried out by computer processor hardware, cause the computer processor hardware to:
establish a secured tunnel between the gateway hardware and a remote communication device over a shared communication link;
receive communications from the multiple communication devices, the received communications destined for delivery to recipients in the remote network; and
selectively forward the received communications over the secured tunnel and a bypass communication path depending on attributes of the received communications.

\* \* \* \* \*